(12) United States Patent
Vaissiere

(10) Patent No.: US 10,901,371 B2
(45) Date of Patent: Jan. 26, 2021

(54) METHOD OF DETERMINING A CALIBRATION OR MAINTENANCE TIME INTERVAL

(71) Applicant: ENDRESS + HAUSER MESSTECHNIK GMBH + CO. KG, Weil am Rhein (DE)

(72) Inventor: Dimitri Vaissiere, Wittersdorf (FR)

(73) Assignee: ENDRESS+HAUSER GROUP SERVICES AG, Reinach (CH)

( * ) Notice: Subject to any disclaimer, the term of this patent is extended or adjusted under 35 U.S.C. 154(b) by 0 days.

(21) Appl. No.: 16/593,028

(22) Filed: Oct. 4, 2019

(65) Prior Publication Data
US 2020/0033813 A1     Jan. 30, 2020

Related U.S. Application Data

(62) Division of application No. 14/247,639, filed on Apr. 8, 2014, now Pat. No. 10,539,930.

(30) Foreign Application Priority Data

Apr. 10, 2013   (EP) ..................................... 13163176

(51) Int. Cl.
  *G04F 13/00*   (2006.01)
  *G01D 18/00*   (2006.01)
(52) U.S. Cl.
  CPC ........... *G04F 13/00* (2013.01); *G01D 18/006* (2013.01)
(58) Field of Classification Search
  CPC ............................. G04F 13/00; G01D 18/006
(Continued)

(56) References Cited

PUBLICATIONS

Oct. 7, 2013 European Search Report, EPO, Munich, Germany.
(Continued)

*Primary Examiner* — John Fitzgerald
*Assistant Examiner* — Rodney T Frank
(74) *Attorney, Agent, or Firm* — Bacon & Thomas, PLLC

(57) ABSTRACT

A method of determining a calibration or maintenance time interval after which a specific measurement device of a given type for measuring a quantity to be measured on a measurement site of an industrial site shall be re-calibrated or maintained is described, comprising the steps of: determining a criticality (C) of the specific device, based on the criticality (C) setting a reliability target (RT) for the device, wherein the reliability target (RT) denominates the probability of the device to be compliant according to a predefined criterion at the end of the calibration or maintenance time interval to be determined by this method, defining compliancy ranges for a measurable degree of compliance of the device, selecting a reliability model for a reliability of the device as a function of a normalized time interval ($t_n$) and a set of at least one parameter ($c1, \ldots, c_m$) from a variety of predefined reliability models, determining a separate set of parameters for the selected reliability model for each of the compliancy ranges based on prescribed reliability expectation values ($RV(t_n^{pd})$) for each of the error ranges, which a reliability function associated with this error range shall comply to at at least one predefined normalized time ($t_n^{pd}$), determining the degree of compliance of the specific measurement device and based on the degree of compliance determining the corresponding compliancy range, determining a normalized calibration or maintenance time ($t_n$) as the time, at which a reliability function ($R(t_n)$) given by the selected reliability model and the set of parameters determined for this compliancy range equals the reliability target (RT), and determining the next calibration or maintenance time interval based on a product of this normalized calibra-
(Continued)

tion or maintenance time ($t_n$) and a given reference time interval ($T_R$).

10 Claims, 3 Drawing Sheets

(58) Field of Classification Search
USPC .......................................................... 73/1.42
See application file for complete search history.

(56) References Cited

PUBLICATIONS

Castrup, H.T., et al., Metrology—Calibration and Measurement Processes Guidelines, NASA Reference Publication 1342, Jun. 30, 1994, pp. 101-103, p. 95, XP055080803, Pasadena, California, Retrieved from the Internet on Sep. 24, 2013, URL: http:/www.hq.nasa.gov/office/codeq/doctree/NASA_RP1342.pdf.

Polimac, Vukan, et al., Maintenance scheduling according to reliability targets and actual equipment performance, Summary for CIRED 2001 Conference Paper in Amsterdam; Jun. 21, 2001, pp. 1-2, XP055080376, Retrieved from the Internet on Sep. 20, 2013, URL: http:/www.cired.net/publications/cired2001/3_13.pdf.

Deaver, David, Calibration Intervals, a Manufacturer's Perspective, Dec. 11, 2012, p. 1, , abstract, XP055080382, Retrieved from the Internet on Sep. 20, 2013, URL: http://www.polycontrols.com/medias/iw/Calibration_Intervals-Fluke.pdf.

UL, Data Acceptance Program—Equipment Calibration Intervals, Dec. 31, 2012, p. 3, para. 1, 00-OP-C0045, Issue 2.0, XP055080346, Retrieved from the Internet on Sep. 20, 2013, URL: http://www.ul.com/global/documents/offerings/services/programs/dap/tools/00-OP-C0045.pdf.

METHOD OF DETERMINING A CALIBRATION OR MAINTENANCE TIME INTERVAL

CROSS-REFERENCE TO RELATED APPLICATIONS

This application is a Divisional application of U.S. patent application Ser. No. 14/247,639, filed on Apr. 8, 2016 and now U.S. Pat. No. 10,539,930 (incorporated herein by reference in its entirety), and which claims priority to EP 13163176.4, filed on Apr. 10, 2013 (incorporated herein by reference in its entirety).

The present invention concerns a method of determining a calibration time interval or a maintenance time interval after which a specific measurement device of a given type for measuring a quantity to be measured operating on a measurement site of an industrial site shall be calibrated or maintained.

Measurement devices are used in nearly all branches of industry for measuring quantities, in particular physical quantities related to ongoing production processes. Measurement results indicating the measured value of the quantity are for example commonly used in process automation for monitoring, controlling and/or regulating an industrial process, in particular a production process. Thus measurement devices play a vital part in industrial processes, and a defect of a device may have severe consequences.

Industrial production sites are quite often very complex sites including a large number of measurement devices on various measurement sites. In order to ensure and/or improve quality and safety of the industrial process it is advantageous, to perform a criticality analysis preferably for every measurement device on the site. Today criticality of a device is typically determined based on a product of a probability of a defect of the respective device and a severity of the consequences of this defect. Criticality analysis thus allows to identify the device forming the greatest risk in terms of probability and severity of the consequences to the overall performance of the process.

In order to ensure, that measurement devices fulfill certain measurement properties specified for them, in particular a specified measurement accuracy, and/or comply to certain standards, they are subject to regular maintenance and calibration.

Calibration is commonly used to check conformity of a device to a given specification. During calibration the measurement device performs at least one measurement task according to a given operating procedure, during which at least one given value of the quantity to be measured by the device is provided by a corresponding reference or standard. Based on the measurement results obtained by the device with respect to the given value of the quantity to be measured, a measurement error of the device is determined. In case the measurement error exceeds a predetermined maximum permissible error, the device is considered not to conform. As a consequence, e.g. adjustment or repair of the measurement device is required, which can then be performed based on the data obtained during the calibration procedure. This includes for example adjustments of offset, gain and/or span of the measurement indication. If the measurement errors do not exceed the maximum permissible error conformity of the device is declared and generally no additional actions are performed.

Calibrations are often performed periodically after fixed calibration time intervals recommended by the manufacturer of the device, which are set solely based on technical properties of the device. Thus they are identical for all devices of the same type. For safety reasons, the calibration time intervals are typically set so short, that statistically most devices, e.g. above 90%, are still in full compliance at the end of their calibration time interval. Thus for the majority of device it would be safely possible to apply much longer calibration time intervals. Short calibration time intervals raise the costs involved in operating these devices. This is especially relevant in applications, where a whole section of a production site has to be shut down, in order to move the device from the measurement site to the calibration site.

Basically the same considerations apply with respect to the determination of maintenance intervals.

Thus there is a need in industry to optimize calibration or maintenance intervals. Methods to determine calibration time intervals are for example described in 'Establishment and adjustment of calibration intervals—Recommended Practice (RP-1), NCSLI, 2010, ISBN 1-58464-062-6. One method described therein is based on a reliability function giving a reliability of the type of measurement device under consideration as a function of a calibration time interval. Reliability denominates the rate of compliance, given by the percentage of devices found to be in compliance after the respective calibration time interval.

Determination of the reliability function however, requires a large amount of so called historical data. To this extent statistically relevant numbers of measurement devices of the respective type have to be calibrated after calibration time intervals covering a sufficiently large range of calibration time intervals in order to reliably determine the rate of devices which are found to be compliant after the respective calibration time intervals.

Once the reliability function is determined for the type of measurement device with a sufficient accuracy, the next calibration time interval of a specific device can be determined based on a desired reliability target to be met by the device. The reliability target denominates the probability that the device will still be compliant at the end of the calibration time interval. FIG. 1 shows an example of a reliability function $RF(t_o)$ giving the percentage of devices of a certain type found in compliance as a function of the calibration time interval after which they were calibrated. If for example for a specific device a reliability target RT of 95% is desired, this means, that a 95% probability is required for this specific device to still be compliant at the end of his calibration time interval. Thus the corresponding calibration time interval T can be derived directly from the reliability function $RF(t_o)$.

This method can only be applied, when sufficient historical data is available for the type of measurement device. In many cases however this data may not be available.

Depending on the properties of the type of device, in particular the expected life time, the length of calibration time intervals, and the amount of time, effort and costs involved in calibrating devices of this type, collection of the required data can be very time and cost intensive. One example are flow meters measuring a flow of a product e.g. through a pipe. Calibration of these flow meters generally requires the use of specially designed calibration rigs, capable of providing a predetermined flow of a given size with a high accuracy, which is then measured by the flow meter. These calibrations are time and cost intensive, since they usually require an interruption of the ongoing production process at the measurement site where the flow meter is operated. Also calibration time intervals especially for flow meters measuring very large flows, can be several years. Thus collection of the required data has to be performed over years.

But there can also be various other reasons, why the necessary data may not be available. One reason is e.g. that potentially available data cannot be trusted. Another reason is that resources to evaluate potentially available data cannot be provided. Also data could not be available, because the device under consideration is a newly developed device, for which no historical data has been recorded yet.

It is an object of the invention to provide a method of determining a calibration time interval or a maintenance time interval after which a specific measurement device of a given type for measuring a quantity to be measured operating on a measurement site of an industrial site shall be calibrated or maintained, which can be performed safely without relying on historical data.

To this extend, the invention comprises a first method of determining a calibration time interval after which a specific measurement device of a given type for measuring a quantity to be measured on a measurement site of an industrial site shall be re-calibrated, comprising the steps of:
 determining a criticality of the specific device,
 based on the criticality setting a reliability target for the device, wherein the reliability target denominates the probability of the device to be compliant according to a predefined criterion at the end of the calibration time interval to be determined by this method,
 defining error ranges for measurement errors of the device,
 selecting a reliability model for a reliability of the device as a function of a normalized time and a set of at least one parameter from a variety of predefined reliability models,
 determining a separate set of parameters for the selected reliability model for each of the error ranges based on prescribed reliability expectation values for each of the error ranges, which a reliability function associated with this error range shall comply to at at least one predefined normalized calibration time,
 determining the measurement error of the specific measurement device and based on the measurement error determining a corresponding error range for the specific measurement device,
 determining a normalized calibration time as the normalized time, at which a reliability function given by the selected reliability model and the set of parameters determined for this error range equals the reliability target, and
 determining the next calibration time interval based on a product of this normalized calibration time and a predetermined reference time interval.

According to a preferred embodiment of this method, devices of the given type are considered compliant, as long as their measurement error does not exceed a predetermined maximum permissible error.

According to a refinement of this method the calibration time interval is set to be equal to a maximum permissible calibration time interval, in case the product of the normalized calibration time and the reference time interval is longer than the maximum permissible calibration time interval.

The invention further comprises a second method of determining a maintenance time interval after which a specific measurement device of a given type for measuring a quantity to be measured on a measurement site of an industrial site shall be maintained again, comprising the steps of:
 determining a criticality of the specific device,
 based on the criticality setting a reliability target for the device, wherein the reliability target denominates the probability of the device to be compliant according to a predefined criterion at the end of the maintenance time interval to be determined by this method,
 defining deviation ranges for deviations of a property of devices of the given type from an ideal status,
 selecting a reliability model for a reliability of the device as a function of a normalized time and a set of at least one parameter from a variety of predefined reliability models,
 determining a separate set of parameters for the selected reliability model for each of the deviation ranges based on prescribed reliability expectation values for each of the deviation ranges, which a reliability function associated with this deviation range shall comply to at at least one predefined normalized time,
 determining the deviation of the specific measurement device and based on the deviation determining a corresponding deviation range for the specific measurement device,
 determining a normalized maintenance time as the normalized time, at which a reliability function given by the selected reliability model and the set of parameters determined for this deviation range equals the reliability target, and
 determining the next maintenance time interval based on a product of this normalized maintenance time and a given reference time interval.

According to a preferred embodiment of the second method,
 an ideal status of a property of measurement devices of the given type is given as a reference, and
 devices of this type are considered compliant as long as their deviations from this ideal status do not exceed a maximum permissible deviation.

According to a refinement of the second method, the maintenance time interval is set to be equal to a maximum permissible maintenance time interval, in case the product of the normalized maintenance time and the reference time interval is longer than the maximum permissible maintenance time interval.

According to a refinement of the first or the second method the reference time interval is determined
 based on a length of a previous calibration time interval,
 as a given percentage of an expected life time of the type of device,
 according to conditions and demands the specific measurement device will be exposed to when put back into operation,
 as a product of a given percentage of the expected life time and a factor accounting for the conditions and demands the specific device will be exposed to, or
 based on the reliability expectation values and a known expected reliability value for this type of device.

According to a preferred embodiment of the first or the second method criticality of a device is determined based on a probability of a defect of the device and a severity of consequences of the defect.

According to a refinement of the first or the second method criticality of a device is determined based on a simplified severity of consequences of the defect, which is based on an impact of the measurement result of the specific measurement device on the application it is used in.

According to a refinement of the first method and the last mentioned refinement the error range is either determined based on an effective error determined based on the measurement error determined during calibration and an additional term reflecting the operating conditions, or the error range
is set equal to the error range corresponding to the determined measurement error, in case the device will be exposed to normal operating conditions and/or the error range corresponding to the determined measurement error is the highest or lowest error range, and is set equal to the error range adjacent to the error range corresponding to the determined measurement error, comprising higher measurement errors than the error range corresponding to the determined measurement error, in case the device will be exposed to harsh operating conditions and the error range corresponding to the determined measurement error is lower than the highest error range, and is set equal to the error range adjacent to the error range corresponding to the determined measurement error, comprising lower measurement errors than the error range corresponding to the determined measurement error, in case the device will be exposed to ideal operating conditions and the error range corresponding to the determined measurement error is higher than the lowest error range.

According to a refinement of the second method and the second to last mentioned refinement the deviation range is either determined based on an effective deviation determined based on the deviation determined during maintenance and an additional term reflecting the operating conditions, or the deviation range
is set equal to the deviation range corresponding to the determined deviation, in case the device will be exposed to normal operating conditions and/or the deviation range corresponding to the determined deviation is the highest or lowest deviation range, and is set equal to the deviation range adjacent to the deviation range corresponding to the determined deviation, comprising higher deviations than the deviation range corresponding to the determined deviation, in case the device will be exposed to harsh operating conditions and the deviation range corresponding to the determined deviation is lower than the highest deviation range, and is set equal to the deviation range adjacent to the deviation range corresponding to the determined deviation, comprising lower deviations than the deviation range corresponding to the determined deviation, in case the device will be exposed to ideal operating conditions and the deviation range corresponding to the determined deviation is higher than the lowest deviation range.

According to a preferred embodiment of the first or the second method, the predefined reliability models comprise an exponential model, a Weibull model and/or a mortality drift model.

According to a preferred embodiment of the first or the second method, one predefined normalized time is the largest normalized time.

According to a refinement of the first or the second method, the sets of model parameters are determined such, that the resulting reliability functions cover a normalized area defined by reliabilities ranging from 0 to 1 and normalized calibration times ranging from 0 to 1.

It is an advantage of the method according to the invention, that it provides a realistic estimation of the future reliability of the specific device, solely based on information available.

The invention and further advantages are explained in more detail using the figures of the drawing.

Figure 1:
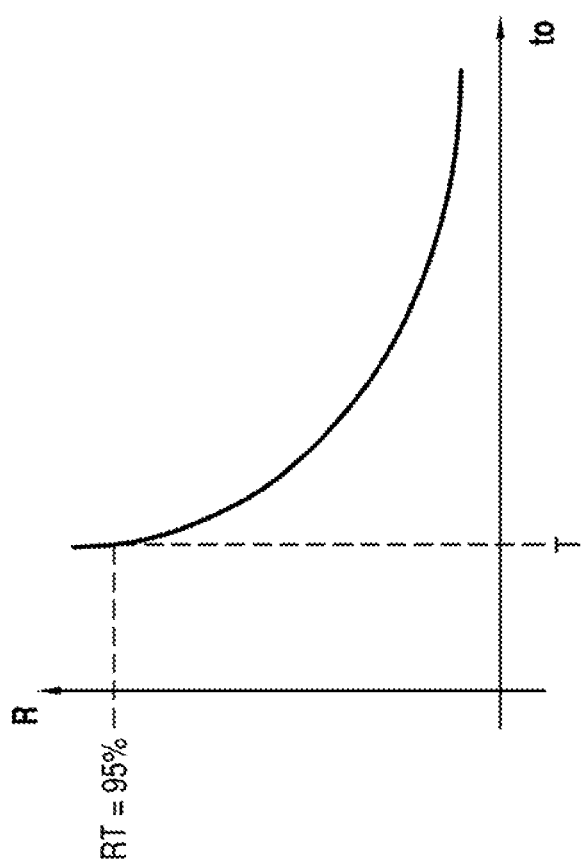
FIG. 1 shows: a reliability function of a measurement device determined based on historical data.

The invention provides a method of determining a calibration time interval after which a specific measurement device of a given type for measuring a quantity to be measured operating on a measurement site of an industrial site shall be re-calibrated.

The measurement device can be any type of measurement device available on the market, like for example a level measurement device for measuring a level of a product in a container, a flow meter for measuring a flow of a product through a pipe, a temperature measurement device or a pressure measurement device. Corresponding to the measurement device, the measurement site can for example be a production hall, any type of container or vessel or a pipe. The industrial site is for example a laboratory, a production plant, a refinery or a steel furnace.

The method comprises a first step of determining a criticality C of the specific device. Criticality assessment can be performed using any method known in industry. For example failure mode and effects analysis (FMEA) methods known in quality and safety management can be used. Criticality C can for example be determined based on a probability P of a of a defect of the device and a severity S of consequences of the defect.

The probability P of a defect of the device is preferably determined based on device specific properties as well as on measurement site specific properties.

The device specific properties preferably include an expected life time of the device, its operating hours and/or its statistical failure rate. The measurement site specific properties of the device preferably include environment conditions prevailing at the measurement site, like for example an exposure of the measurement device to harsh conditions such as high or varying temperatures and/or pressures, aggressive and/or abrasive media and/or vibrations.

The severity S of the consequences of the defect of the device is preferably determined based on information pertinent to the industrial site and the measurement site embedded therein. This information is for example retrieved by a thorough analysis of the industrial (production) process performed on the industrial site in which preferably all potential consequences of the defect of the device are taken into account. The consequences of the defect include for example safety hazards the defect causes for people, for the environment and/or for the measurement site and the industrial site it is embedded in, consequences regarding the quality, quantity and the availability of end—, intermediate—or by-products produced by the industrial process, as well as consequences regarding the operating costs involved in running the industrial process.

Criticality C can for example be expressed in terms of discrete levels of criticality, e.g. high, medium and low criticality. Alternatively continuous values of criticality C can be assigned.

In case neither the operator of the device, nor the entity performing the calibration can provide sufficient information to perform a thorough analysis of the criticality C of the device, criticality C can be determined solely based on a simplified determination of the severity S of the consequences of a defect of the device. Simplified determination of the severity S is based on the impact of the measurement results on the application it is used in. Preferably, simplified severity levels are defined according to the impact of the measurement results.

As an example, a very low simplified severity level will be assigned to devices providing measurement results, which are solely indicated, but not put to any further use.

A low simplified severity level will be assigned to devices providing measurement results, which are used for passive monitoring e.g. of a production process. Passive monitoring includes for example the recording of measurement data, which is not directly applied, to trigger further actions.

An intermediate simplified severity level will be assigned to devices providing measurement results, which are used for monitoring and controlling e.g. of a production process. As an example, a level of a product in a container can be monitored in order to control a valve regulating a quantity of product supplied to the container.

A higher simplified severity level will be assigned to devices providing measurement results, which are used for ensuring relevant properties e.g. of the production process or the products produced.

The highest simplified severity level will be assigned to devices providing measurement results, which are used for ensuring safety.

Based on the criticality C a reliability target RT is set for the device.

The reliability target RT denominates the desired probability for the specific device to be compliant to a predefined criterion until the end of the calibration time interval to be determined by this method. A measurement device is for example considered to be compliant as long as its measurement error E does not exceed a maximum permissible measurement error +/−MPE. The maximum permissible measurement error MPE is for example a required measurement accuracy or a measurement accuracy according to the specification of the device. Thus the reliability target RT can be defined as the probability for the measurement device to exhibit a measurement error smaller than the maximal permissible measurement error MPE during the entire next calibration time interval T to be determined by this method.

As a general rule higher reliability targets RT will be set for devices having a higher criticality C and lower reliability targets RT will be set for devices having a lower criticality C. Thus a reliability target RT of e.g. 99% will for example be required for a device having a high criticality level, whereas a considerably lower reliability target RT, e.g. of 75%, can for example be set for a device having a low criticality level.

In addition levels of compliance are defined for the measurement device. Since compliance is usually determined based on the measurement error E of the device, the compliance levels can be defined as error ranges for measurement errors of the device. They can for example be error ranges limited by given percentages of the maximum permissible measurement error MPE. In the example shown in FIG. 2 six error ranges indicated by encircled numbers are defined in terms of percentages of the maximum permissible error MPE.

The first error range comprises all measurement errors E ranging from −25% to 25% of the maximum permissible error MPE. The second error range comprises all measurement errors ranging from −50% MPE to −25% MPE and from +25 MPE to +50% MPE. The third error range comprises all measurement errors ranging from −75% to −50% MPE and from +50% MPE to +75% MPE. The fourth error range comprises all measurement errors ranging from −100% MPE to −75% MPE and from +75% MPE to +100% MPE. The fifth error range comprises all measurement errors ranging from −125% to −100% MPE and from +100% MPE to +125% MPE. The sixth error range comprises all measurement errors exceeding +/−125% of the MPE.

In order to determine the calibration time interval, after which the specific measurement device shall be re-calibrated, a reliability model suitable for modeling the reliability of measurement devices of the given type is selected from a variety of predefined reliability models. Each of these predefined models defines the reliability R as function of a normalized time $t_n$ and a set of at least one model parameter $[c_1, \ldots, c_m]$.

The model is chosen based on general knowledge about the type of device, in particular its physical properties determining the time dependency of the measurement uncertainty of devices of this type.

Examples for suitable models for various types of measurement devices are described in 'Establishment and adjustment of calibration intervals-Recommended Practice (RP-1), NCSLI, 2010, ISBN 1-58464-062-6.

One example described therein is an exponential model, e.g. given by:

$$R(t_n) = e^{-c_1 t_n}$$

which is suitable for modeling reliability of measurement devices known to exhibit a constant non-compliance rate.

Another example described therein is the Weibull model e.g. given by:

$$R(t_n) = e^{-(c_1 t_n)^{c_2}}$$

which is preferably applied with respect to measurement devices exhibiting a constant non-compliance rate with a superimposed burn-in or wear out period.

Yet another example mentioned therein is the mortality drift model, e.g. given by $$R(t_n) = e^{-(c_1 t_n + c_2 t_n^2)}$$

which is preferably applied with respect to measurement devices exhibiting a non-compliance rate, which varies slowly over time.

Obviously the invention is not limited to the examples of reliability models given above. Other models known in the art suitable for modeling the reliability of measurement devices of the given type can be used.

Whereas according to the prior art a single set of parameters is determined for a suitable model based on large amounts of historical data derived from previously performed calibrations, parameters are set here in correspondence with the predetermined error ranges.

To this extent a different set of model parameters $(c_1, \ldots, c_m)$ is determined for each of the error ranges. The parameter sets $(c_1, \ldots, c_m)$ are chosen such, that the resulting reliability functions $R(t_n; c_1, \ldots, c_m)$ cover the normalized area $[0, 1]^2$ defined by reliabilities $R(t_n)$ ranging from 0 to 1 and normalized times $t_n$ ranging from 0 to 1:

$$R(t_n) \in [0;1] \text{ and } t_n \in [0;1]$$

A fairly even coverage of this area can be achieved, by prescribing reliability expectation values $RV(t_n^{pd})$ for each of the error ranges, which the reliability function associated to the respective error range shall comply to at a certain pre-defined normalized time $t_n^{pd}$. If only one pre-defined normalized time $t_n^{pd}$ is used, it is preferably equal to the largest normalized time $t_n=1$ within the area. Preferably additional reliability expectation values $RV(t_n^{pd})$ for each of the error ranges are prescribed, which the reliability function associated to the respective error range shall comply to at at least one additional pre-defined normalized time $t_n^{pd}$ within the time range $t_n \in [0;1]$. For example additional normalized times $t_n^{pd}$ of 20%, 30%, 50% and/or 90% of the largest normalized time $t_n=1$ can be applied.

The following table gives an example of prescribed reliability expectation values $RV(t_n^{pd}=1)$ for the six error ranges described above at the largest normalized time $t_n=1$.

| Error range | $RV(t_n^{pd} = 1)$ |
|---|---|
| 1 | ≥95% |
| 2 | ≥80% |
| 3 | ≥60% |
| 4 | ≥25% |
| 5 | ≥5% |
| 6 | ≈0% |

When applying the exponential model, the following prescribed reliability expectation values $RV(t_n^{pd})$ for each error range at the largest normalized time of $t_n^{pd}=1$ and at an additional normalized time $t_n^{pd}$ of 20% of the largest normalized time of $t_n^{pd}=0.2$ listed in the table below can be used as a default:

| Error range | $RV(t_n^{pd} = 0.2)$ | $RV(t_n^{pd} = 1)$ |
|---|---|---|
| 1 | ≥97.5% | ≥95% |
| 2 | ≥90% | ≥80% |
| 3 | ≥80% | ≥60% |
| 4 | ≥50% | ≥25% |
| 5 | ≥25% | ≥5% |
| 6 | ≥10% | ≈0% |

When applying the weibull model, the following prescribed reliability expectation values $RV(t_n^{pd})$ for each error range at the largest normalized time of $t_n^{pd}=1$ and at an additional normalized time $t_n^{pd}$ of 50% of the largest normalized time of $t_n^{pd}=1$ listed in the table below can be used as a default:

| Error range | $RV(t_n^{pd} = 0.5)$ | $RV(t_n^{pd} = 1)$ |
|---|---|---|
| 1 | ≥99.5% | ≥95% |
| 2 | ≥95% | ≥80% |
| 3 | ≥85% | ≥60% |
| 4 | ≥75% | ≥25% |
| 5 | ≥50% | ≥5% |
| 6 | ≤10% | ≈0% |

The parameter sets of the reliability functions associated to the error ranges are then determined to fulfill the above preconditions. By applying the parameter sets to the selected reliability model each parameter set renders a reliability function associated with the respective error range.

Figure 2:
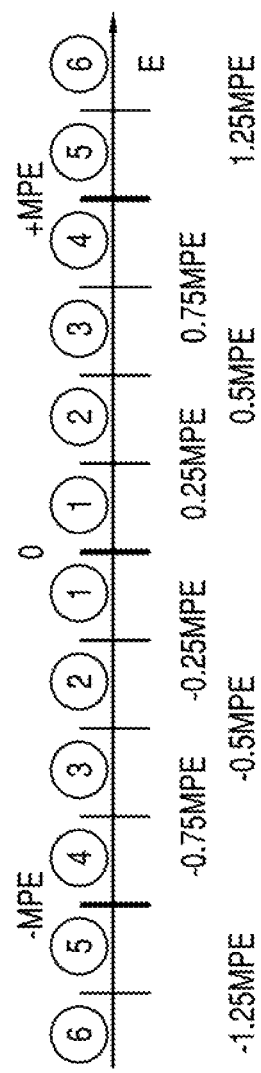
FIG. 2 shows: measurement error levels of a measurement device.
Figure 3:
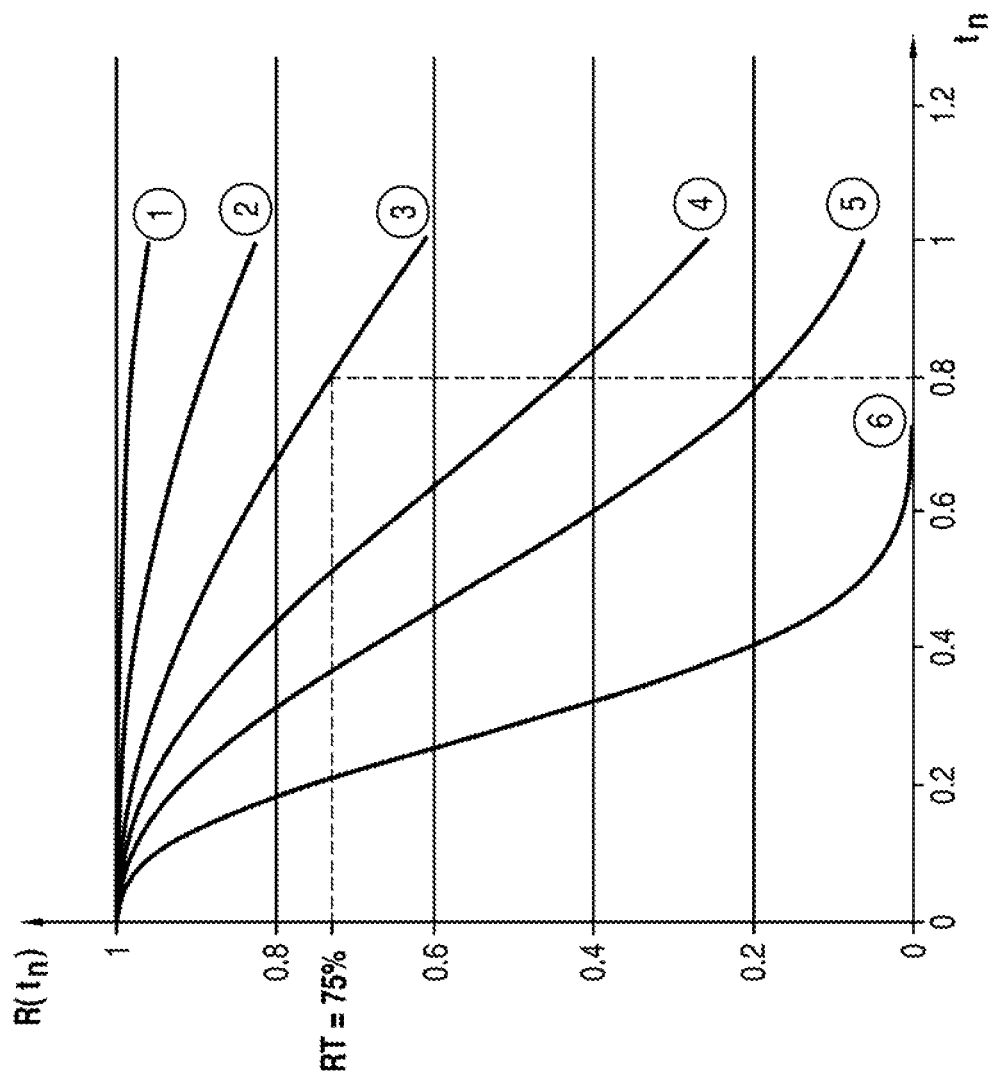
FIG. 3 shows: six reliability functions based on the Weibull model, each based on a set of parameters set in correspondence to one of the measurement error levels shown in FIG. 2.

FIG. 3 shows six reliability functions which are all based on the Weibull model, wherein each function was obtained by applying a set of parameters predetermined for one of the six error ranges shown in FIG. 2.

The corresponding error ranges are indicated in FIG. 3 by encircled numbers corresponding to the error range numbers shown in FIG. 2.

In a next step the specific measurement device under consideration is calibrated. To this extend standard calibration methods known in the art for the particular type of measurement device can be applied. During calibration a measurement error E of the specific measurement device is determined.

Following this, the error range within which the determined measurement error E falls is determined. Following this the next calibration time interval after which this specific device shall be re-calibrated is determined based on the reliability function $R(t_n)$ corresponding this error range and the previously determined reliability target RT. Thus the reliability function $R(t_n)$ corresponding to the error range determined for the specific device yields the normalized calibration time $t_n$ corresponding to the desired reliability target RT.

If for example a measurement error E of +60% of the maximum permissible error MPE was determined during calibration, this error falls within the third error range. Thus the reliability function $R(t_n)$ marked with the encircled number 3 in FIG. 3 will be applied. If in this example a reliability target RT of 75% is required, the reliability function $R(t_n)$ corresponding to the third error range yields a normalized calibration time interval of 0.8.

Finally, the calibration time interval T is determined as a product of the normalized calibration time $t_n$ and a pre-defined reference time interval $T_R$. The reference time interval $T_R$ can for example be a given percentage of an expected life time of the type of device. Alternatively, the reference time interval $T_R$ can be set according to the conditions and demands the specific measurement device will be exposed to when put back into operation. Also a combination of the two alternatives is possible, by setting the reference time interval $T_R$ equal to a product of a given percentage of the expected life time and a factor accounting for the conditions and demands the specific device will be exposed to.

In case additional information on the expected reliability of the device is available, this can also be used, to set the reference calibration time interval $T_R$. As an example coriolis flow meters used under normal conditions can be expected to reach a reliability greater than 90% after 5 years. This known expectation value is then compared to the reliability expectation values $RV(t_n^{pd})$ for the six error ranges at the largest normalized time $t_n=1$, and the reference calibration time interval $T_R$ is then set based on the outcome of the comparison. In the given example, a reliability of more then 90% at the largest normalized time $t_n=1$ corresponds to the first error range, so that in this case the reference calibration time interval $T_R$ would be set to 5 years.

As another alternative, $T_R$ can be determined based on length of the previously applied calibration time interval.

In addition to the reference time interval $T_R$ a maximum permissible calibration time interval $T_{max}$ can be defined, e.g. based on safety regulations prevailing at the measurement site or based on customer demands. In that case the calibration time interval T determined by this method will be limited to this maximum permissible calibration time interval $T_{max}$. Thus the calibration time interval T will be set to be equal to a maximum permissible calibration time interval $T_{max}$, in case the product of the normalized calibration time $t_n$ and the reference time $T_R$ interval is longer than the maximum permissible calibration time interval $T_{max}$, and set equal to the calibration time interval T determined as described above, in case the product of the normalized time $t_n$ and the reference time interval $T_R$ is shorter than the maximum permissible calibration time interval $T_{max}$.

$$\begin{cases} T = t_n \cdot T_R & \text{if } t_n \cdot T_R < T_{max} \\ T = T_{max} & \text{otherwise} \end{cases}$$

Considering a device, which is operated under normal operating conditions, the reliability functions for the error ranges automatically account for the probability of a defect of the device. If the device is however operated under better or worse than normal conditions, this will alter the probability of a defect of the device. This can be accounted for in two different ways.

One way is to determine the criticality C by taking into account the operating conditions. This can be done as described above, by determining the criticality C as a product of the probability P of a defect and the severity S of the consequences of a defect. Here a higher criticality C is assigned to devices operated in harsh environments. In consequence a higher reliability target RT is set, and the method renders a calibration time interval T, which can be safely applied.

In case the criticality C is however solely determined based on the simplified severity, the operation conditions, the device is exposed to, are not accounted for in the criticality C. In consequence, they are not reflected in the reliability target RT set according to the criticality C.

In this case, the operation conditions can be accounted for, when determining the error range for the specific measurement device. Here the error range is not only determined based on the measurement error E determined during calibration but also based on the operation conditions, the device will be exposed to, after being put back into operation.

To this extend, the error range can be determined based on an effective error given by a sum of the measurement error E and an additional term accounting for the operating conditions. The term equals zero in case normal operating conditions prevail. The term increases the resulting absolute value of the effective error in case the device is exposed to harsh operating conditions and it decreases the resulting absolute value of the effective error in case the device is exposed to ideal operating conditions.

As an alternative, the error range for the specific device can be determined based on the determined measurement error and the operating conditions. In this case the error range is set equal to the error range corresponding to the determined measurement error, in case the device will be exposed to normal operating conditions and/or in case the error range corresponding to the determined measurement error is the highest or lowest error range.

In case the device will be exposed to harsh operating conditions however, the error range is set equal to the error range adjacent to the error range corresponding to the determined measurement error, comprising higher measurement errors than the error range corresponding to the determined measurement error.

In case the device will be exposed to ideal operating conditions however, the error range is set equal to the error range adjacent to the error range corresponding to the determined measurement error, comprising lower measurement errors than the error range corresponding to the determined measurement error.

In case there is no such adjacent higher or lower error range, because the measurement error range corresponding to the determined measurement error is the highest or lowest error range respectively, the error range corresponding to the determined measurement error will be used.

Following this the next calibration time interval T is then determined as described above, but based on the reliability function $R(t_n)$ corresponding to the error range determined by accounting for the operating conditions the device will be exposed to.

The method described above can not only be applied, to determine calibration time intervals for measurement devices, it can also be applied in the same way, to determine maintenance time intervals between consecutive maintenances to be performed on the device.

For that purpose, criticality C of the device is determined in the same way as described above. Based on the criticality C a reliability target RT is set for the device. Again the reliability target RT denominates the probability of the device to be compliant to a predefined criterion during the entire next maintenance time interval. Compliancy in this case denominates compliancy to a predefined maintenance criterion. This criterion can for example be related to wear and tear of certain relevant parts of the device, e.g. a degree of corrosion of an electrode that can be tolerated or a degree of clogging of a filter that can be tolerated. Alternatively a weighted sum of two or more maintenance criteria can used to determine, whether the device is compliant or not.

Preferably an ideal status of a property of the measurement device of the given type is taken as a reference, allowing for deviations of this property of a specific device from this ideal status to be determined. Following this a device is considered compliant, as long the deviation from the ideal status does not exceed maximum permissible deviation MPD.

Thus the reliability target RT can be defined as the probability for the measurement device to exhibit a deviation smaller than the maximal permissible deviation MPD during the entire next maintenance time interval to be determined by this method. As described above with respect to the calibration time interval determination, reliability targets RT will be set higher for devices having a higher criticality C and lower for devices having a lower criticality C.

The maximum permissible deviation MPD corresponds to the maximum permissible error MPE described above with respect to the calibration time interval determination.

In case of a quantitatively measurable deviation from the ideal status the maximum permissible deviation MPD is given as a reference value, and deviation ranges can be defined as percentages of the maximum permissible deviation MPD.

Quite often however, deviations from the ideal status are not determined in form of quantitatively measured values, but in form of status levels, denominating the degree of deviation of the respective property from the ideal status. In this case deviation ranges are defined in form of these status levels. As an example an electrode can exhibit the status levels: highly corroded, slightly corroded or not corroded. A filter can exhibit the status levels: free, partially blocked or completely blocked.

In this case the maximum permissible deviation MPD corresponds to the status level comprising the statuses with the highest permissible deviation from the ideal status.

In order to determine the maintenance time interval, after which the measurement device shall be maintained again, a reliability model suitable for modeling the reliability of measurement devices of the same type as the device under consideration is chosen.

The reliability model defines the reliability R as function of a normalized time interval. Again the model is chosen based on general knowledge about the given type of device, in particular their physical properties determining the time dependency of the uncertainty of the deviation from the ideal status to be expected. To this extend, the same models can be used, as for the determination of the calibration time interval.

Again a different set of model parameters is set for each of the deviation ranges. The parameters of each set are chosen in the same way as described above with respect to the calibration time interval determination. By applying the parameter sets to the selected reliability model each parameter set renders a reliability function associated with the respective deviation range.

In a next step the specific measurement device under consideration is maintained. To this extend standard maintenance procedures known in the art for the particular type of measurement device can be applied. During maintenance, the deviation of the measurement device from its ideal status is determined.

Following this, the deviation range is determined, and the next maintenance time interval is determined based on the reliability function $R(t_n)$ corresponding to this deviation range and the previously determined reliability target RT. Again, the deviation range can be determined solely based on the deviation determined during maintenance. If however the criticality C and in consequence the set reliability target RT do not account for operating conditions, the device will be exposed to, the deviation range is preferably determined based on the deviation determined for the device and the operating conditions it will be exposed to. This can be done exactly the same way, as described above, with respect to the calibration time interval determination.

To this extend, the reliability function $R(t_n)$ corresponding to the deviation range determined for the device under maintenance yields the normalized maintenance time corresponding to the desired reliability target RT.

Finally, the maintenance time interval is determined as a product of the normalized maintenance time $t_n$ and a predefined reference time interval $T_R$. Again, the reference time interval $T_R$ can for example be a given percentage of an expected life time of the type of device, or can be set according to the conditions and demands the specific device will be exposed to when put back into operation. Also a combination of the two alternatives is possible, by setting the reference time interval $T_R$ equal to a product of a given percentage of the expected life time and a factor accounting for the conditions and demands the device will be exposed to.

In addition to the reference time interval $T_R$ a maximum permissible maintenance time interval $T_{max}$ can be defined, e.g. based on safety regulations prevailing at the measurement site or based on customer demands. This can be done exactly the same way, as described above, with respect to the calibration time interval determination.

In that case the maintenance time interval determined by this method will be limited by this maximum permissible maintenance time interval $T_{max}$. Thus the maintenance time interval will be set to be equal to a maximum permissible maintenance time interval $T_{max}$, in case the product of the normalized maintenance time interval $t_n$ and the reference time interval $T_R$ interval is larger than the maximum permissible maintenance time interval $T_{max}$, and set equal to the maintenance time interval determined as described above, in case the product of the normalized maintenance time interval $t_n$ and the reference time $T_R$ interval is larger than the maximum permissible maintenance time interval $T_{max}$.

The invention claimed is:

1. Method of determining a maintenance time interval after which a specific measurement device of a given type for measuring a quantity to be measured on a measurement site of an industrial site shall be maintained again, comprising the steps of:
    determining a criticality (C) of the specific device,
    based on the criticality (C) setting a reliability target (RT) for the device, wherein the reliability target (RT) denominates the probability of the device to be compliant according to a predefined criterion at the end of the maintenance time interval to be determined by this method,
    defining deviation ranges for deviations of a property of devices of the given type from an ideal status,
    selecting a reliability model for a reliability of the device as a function of a normalized time ($t_n$) and a set of at least one parameter ($c_1, \ldots, c_m$) from a variety of predefined reliability models,
    determining a reliability function for each deviation range by determining a separate set of parameters for the selected reliability model for each of the deviation ranges based on prescribed reliability expectation values ($RV(t_n^{pd})$) for each of the deviation ranges, which a reliability function associated with this deviation range shall comply to at at least one predefined normalized time ($t_n^{pd}$),
    determining the deviation of the specific measurement device and based on the deviation determining the corresponding deviation range for the specific measurement device,
    determining a normalized maintenance time ($t_n$) as the normalized time, at which the reliability function ($R(t_n)$) determined for the deviation range corresponding to the deviation of the specific device and given by the selected reliability model and the set of parameters determined for this deviation range equals the reliability target (RT), and
    determining the next maintenance time interval, after which the specific measurement device shall be maintained again, based on a product of this normalized maintenance time ($t_n$) and a given reference time interval ($T_R$).

2. Method according to claim 1, wherein
    an ideal status of a property of measurement devices of the given type is given as a reference, and
    devices of this type are considered compliant as long as their deviations from this ideal status do not exceed a maximum permissible deviation (MPD).

3. Method according to claim 1, wherein the maintenance time interval is set to be equal to a maximum permissible maintenance time interval ($T_{max}$), in case the product of the normalized maintenance time ($t_n$) and the reference time interval ($T_R$) is longer than the maximum permissible maintenance time interval ($T_{max}$).

4. Method according to claim 1, wherein the reference time interval ($T_R$) is determined
    based on a length of a previous calibration time interval, as a given percentage of an expected life time of the type of device, according to conditions and demands the specific measurement device will be exposed to when put back into operation, as a product of a given percentage of the expected life time and a factor accounting for the conditions and demands the specific device will be exposed to, or based on the reliability expectation values ($RV(t_n^{pd})$) and a known expected reliability value for this type of device.

5. Method according to claim 1, wherein criticality (C) of a device is determined based on a probability (P) of a defect of the device and a severity (S) of consequences of the defect.

6. Method according to claim 1, wherein criticality (C) of a device is determined based on a simplified severity (S) of consequences of the defect, which is based on an impact of the measurement result of the specific measurement device on the application it is used in.

7. Method according to claim 6, wherein the deviation range is either determined based on an effective deviation determined based on the deviation determined during maintenance and an additional term reflecting the operating conditions, or the deviation range is set equal to the deviation range corresponding to the determined deviation, in case the device will be exposed to normal operating conditions and/or the deviation range corresponding to the determined deviation is the highest or lowest deviation range, and is set equal to the deviation range adjacent to the deviation range corresponding to the determined deviation, comprising higher deviations than the deviation range corresponding to the determined deviation, in case the device will be exposed to harsh operating conditions and the deviation range corresponding to the determined deviation is lower than the highest deviation range, and is set equal to the deviation range adjacent to the deviation range corresponding to the determined deviation, comprising lower deviations than the deviation range corresponding to the determined deviation, in case the device will be exposed to ideal operating conditions and the deviation range corresponding to the determined deviation is higher than the lowest deviation range.

8. Method according to claim 1, wherein the predefined reliability models comprise an exponential model, a Weibull model and/or a mortality drift model.

9. Method according to claim 1, wherein one predefined normalized time ($t_n^{pd}$) is the largest normalized time ($t_n^{pd}=1$).

10. Method according to claim 1, wherein the sets of model parameters ($c_1, \ldots, c_m$) are determined such, that the resulting reliability functions ($R(t_n; c_1, \ldots, c_m)$) cover a normalized area ($[0, 1]^2$) defined by reliabilities ($R(t_n)$) ranging from 0 to 1 and normalized calibration times ($t_n$) ranging from 0 to 1.

* * * * *